(12) United States Patent
Ahmed et al.

(10) Patent No.: US 9,330,071 B1
(45) Date of Patent: May 3, 2016

(54) TAG MERGING

(75) Inventors: Waqas Ahmed, Bellevue, WA (US);
Russell A. Dicker, Seattle, WA (US);
Scott Allen Mongrain, Seattle, WA (US);
Val Dan Dar Ion I. Rosca, Iasi (RO);
Florin V. Manolache, Succava (RO);
Corneliu Gabriel Alexandru Rudeanu, Iasi (RO)

(73) Assignee: Amazon Technologies, Inc., Seattle, WA (US)

( * ) Notice: Subject to any disclaimer, the term of this patent is extended or adjusted under 35 U.S.C. 154(b) by 1938 days.

(21) Appl. No.: 11/851,226

(22) Filed: Sep. 6, 2007

(51) Int. Cl.
*G06F 17/00* (2006.01)
*G06F 17/22* (2006.01)
*G06F 17/30* (2006.01)
*G06F 17/24* (2006.01)
*G06F 17/21* (2006.01)

(52) U.S. Cl.
CPC .......... *G06F 17/2247* (2013.01); *G06F 17/211* (2013.01); *G06F 17/24* (2013.01); *G06F 17/30* (2013.01); *G06F 17/3089* (2013.01)

(58) Field of Classification Search
CPC ... G06F 17/211; G06F 17/24; G06F 17/2247; G06F 17/30; G06F 17/3089
USPC .................. 715/259, 233, 205–208, 234, 273
See application file for complete search history.

(56) References Cited

U.S. PATENT DOCUMENTS

| | | | |
|---|---|---|---|
| 6,675,355 B1* | 1/2004 | Demopoulos et al. ........ | 715/233 |
| 7,752,534 B2* | 7/2010 | Blanchard et al. ............ | 715/204 |
| 2005/0259871 A1* | 11/2005 | Li et al. ......................... | 382/173 |
| 2006/0242178 A1* | 10/2006 | Butterfield et al. ........... | 707/100 |
| 2007/0067217 A1* | 3/2007 | Schachter et al. ............... | 705/14 |
| 2007/0067331 A1* | 3/2007 | Schachter et al. ............ | 707/102 |
| 2007/0078832 A1* | 4/2007 | Ott et al. ........................... | 707/3 |
| 2007/0124208 A1* | 5/2007 | Schachter et al. ............... | 705/14 |
| 2007/0130207 A1* | 6/2007 | Pate ....................... | G06Q 30/02 |
| 2007/0133064 A1* | 6/2007 | Itogawa et al. ............... | 358/403 |
| 2007/0143298 A1* | 6/2007 | Surendran et al. .............. | 707/10 |
| 2008/0059897 A1* | 3/2008 | Dilorenzo ..................... | 715/764 |
| 2008/0071929 A1* | 3/2008 | Motte et al. ................... | 709/246 |
| 2008/0072145 A1* | 3/2008 | Blanchard ............... | G06F 17/22 715/273 |
| 2008/0086496 A1* | 4/2008 | Kumar et al. ................. | 707/102 |
| 2008/0091670 A1* | 4/2008 | Ismalon ............................ | 707/5 |

(Continued)

OTHER PUBLICATIONS

"Amazon Web Services UK Blog: Tag You're It", archived 2005, pp. 1-2, retrieved from http://web.archive.org/web/20051215050956/http://aws.typepad.com/aws_uk/2005/11/tag_youre_it_.html.*

(Continued)

*Primary Examiner* — Thu Huynh
(74) *Attorney, Agent, or Firm* — Lee & Hayes, PLLC

(57) ABSTRACT

Tag merging enables a hosting entity such as a website to determine one or more tags that are logically-related to a particular tag and to present these tags to users to enable the users to vote whether to merge a logically-related tag with the particular tag. The hosting entity may determine these logically-related tags in multiple ways. For instance, the hosting entity may analyze keyword-to-keyword similarity data, item-overlap data, or may employ stemming logic. When the entity presents these tags to a user, the user may vote to merge the particular tag with one or more of the presented logically-related tags. When merged, items associated with the selected logically-related tag may become associated with the particular tag, or vice versa. Additionally, the selected tag may be removed from the items previously associated with the selected tag, or vice versa.

24 Claims, 10 Drawing Sheets

(56) References Cited

U.S. PATENT DOCUMENTS

| | | | |
|---|---|---|---|
| 2008/0092044 A1* | 4/2008 | Lewis | G06F 17/30722 715/713 |
| 2008/0092054 A1* | 4/2008 | Bhumkar et al. | 715/739 |
| 2008/0154878 A1* | 6/2008 | Rose | G06F 17/30867 |
| 2008/0215583 A1* | 9/2008 | Gunawardena et al. | 707/7 |
| 2008/0222105 A1* | 9/2008 | Matheny | 707/3 |
| 2008/0243510 A1* | 10/2008 | Smith | 704/259 |
| 2008/0259667 A1* | 10/2008 | Wickeraad | 365/49.1 |
| 2008/0288541 A1* | 11/2008 | Venturini | 707/104.1 |
| 2008/0306913 A1* | 12/2008 | Newman | G06F 17/30867 |
| 2009/0006342 A1* | 1/2009 | Wong et al. | 707/4 |
| 2009/0006442 A1* | 1/2009 | Anderson et al. | 707/102 |
| 2009/0046898 A1* | 2/2009 | Li et al. | 382/113 |
| 2009/0058847 A1* | 3/2009 | Lewis | 345/418 |
| 2010/0049766 A1* | 2/2010 | Sweeney et al. | 707/737 |

OTHER PUBLICATIONS

Chien-Kang Huang, Lee-Feng Chien, and Yen-Jen Oyang. 2003. Relevant term suggestion in interactive web search based on contextual information in query session logs. J. Am. Soc. Inf. Sci. Technol. 54, 7 (May 2003), 638-649.*

David Weinberger, "Taxonomies to Tags: From Trees to Piles of Leaves" Esther Dyson's Monthly Report Release 1.0, Feb. 2005, vol. 23, No. 2, pp. 1-36.*

Céline Van Damme, Martin Hepp, Katharina Siorpaes; "FolksOntology: An Integrated Approach for Turning Folksonomies into Ontologies" Bridging the Gep between Semantic Web and Web 2.0 (SemNet 2007); (May 9, 2007), pp. 57-70.*

Scott Kelby; The Photoshop® Elements 5 Book for Digital Photographers; Nov. 13, 2006; New Riders, p. 30.*

"Amazon.com: Tag anime" archived Jul. 9, 2006, pp. 1-2, retrieved from http://web.archive.org/web/20060709081125/http://amazon.com/gp/tagging/glance/anime.*

"Term merge|Drupal.org" archived May 15, 2007, pp. 1-2, retrieved from http://web.archive.org/web/20070515015834/http://drupal.org/project/term_merge.*

"Amazon.com: Help > Enhancing Your Shopping Experience > Your Community > Tags" archived Feb. 6, 2007, pp. 1-4, retrieved from "http://web.archive.org/web/20070206213129/www.amazon.com/gp/help/customer/display.html?ie=UTF8&nodeId=16238571".*

"Amazon.com : Most Popular Tags" archived Aug. 11, 2006, pp. 1-4, retrieved from http://web.archive.org/web/20060811140050/http://www.amazon.com/gp/tagging/cloud.*

"Amazon.com: books" archived Aug. 8, 2007, pp. 1-2, retrieved from http://web.archive.org/web/20070808161020/http://www.amazon.com/tag/books/glance.*

\* cited by examiner

TAG MERGING

BACKGROUND

Unlike traditional brick-and-mortar businesses, companies utilizing e-commerce websites often do not have a physical store or location where a salesperson can help both novice and knowledgeable customers find sought-after products. Instead, a customer navigating an e-commerce website typically attempts to identify a product that meets the customer's needs. Even a customer with considerable experience navigating e-commerce websites sometimes experiences difficulty in locating a desired product from among hundreds or thousands of offered products. For novice customers, meanwhile, the task of shopping online via the web can be unproductive and even frustrating.

In response to these difficulties, these companies continually strive to make their e-commerce websites more dynamic, compelling, and easier for users to navigate and locate products. To help meet these goals, one recent innovation allows customers to search for a product by tags associated with that product. Tags essentially enable customers, the e-commerce company, or some other entity the ability to easily categorize products. For instance, a customer who has purchased or who views a certain digital camera may tag this camera as "Digital Camera", "Cool Camera", or even "Great Gift for Dad". In instances where the customer tags the camera "Digital Camera", this camera will appear in a returned listing of products responsive to other customers conducting a tag search for "Digital Camera".

To further the usefulness of these tags, companies utilizing e-commerce websites strive to increase "tag concordance". That is, these companies desire to avoid redundancy or splintering of certain highly related tags. Accordingly, among other potential improvements, there remains a need for improving tag concordance for products and other elements on an e-commerce website.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
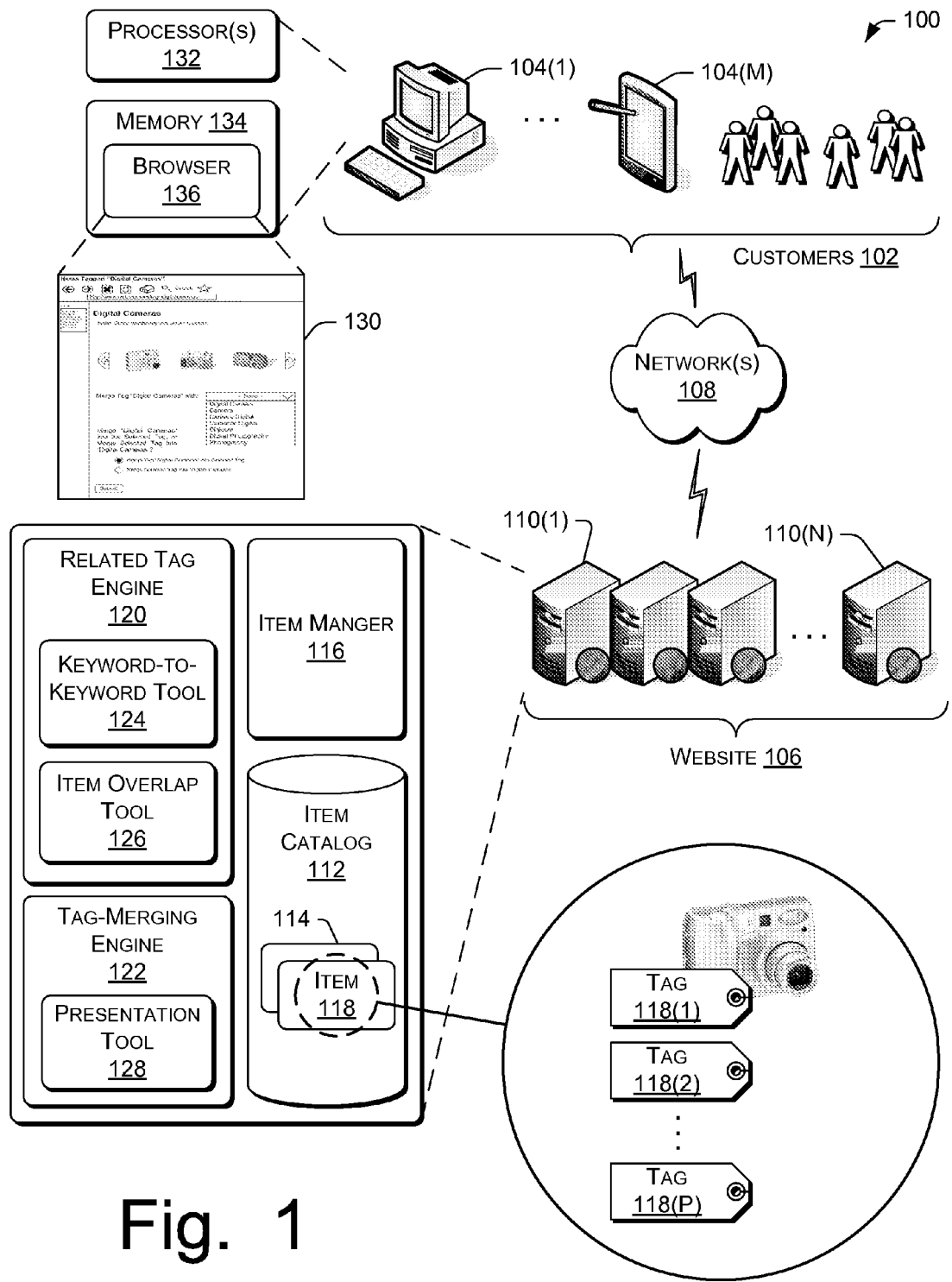
FIG. 1 is a schematic diagram of an illustrative architecture for implementing tag merging for items within an electronic catalog. The network environment includes multiple clients coupled via a network to a server system that hosts the electronic catalog.

Embodiments of the present disclosure are directed to, among others, merging tags that are associated with elements within an electronic catalog and made available over a network such as, for example, the Internet. As an overview, an element may be a product, a service, a sellable unit, a user profile, user-created content (e.g., artwork), or anything else to which a tag may be associated. Tagging, meanwhile, enables a community of users or other entities to define and assign different tags to the elements. Tags are user-generated metadata about the elements. In other words, tags are pieces of information separate from, but related to, the elements. In a collaborative environment, the tags are descriptors that may be freely chosen by different users to characterize or otherwise describe attributes of the elements, rather than having the description controlled by a centralized classification process. With this freedom, the tags can specify properties of an element that may not otherwise be obvious from the element itself and/or which may have special meaning only to the user or a subset of users. Once assigned to elements, the tags may then be used to locate the elements via a tag search. Although embodiments are described as having alpha-numeric tags, other types of tags can be used, including icons, photos, and/or video clips.

In some instances, two or more tags may be related to such a degree that a single tag may better serve users searching the electronic catalog. That is, imagine that a tag entitled "Digital Camera" is associated with a collection of elements within the electronic catalog. Imagine further that another tag "Digital Cameras" (plural) is associated with another collection of elements. Therefore, if a user conducts a tag search for "Digital Camera", the user may not see certain items tagged "Digital Cameras" but not "Digital Camera". The converse may also be true. Here, the two tags may be so related such that a single tag (e.g., "Digital Camera" or "Digital Cameras") that is associated with both collections of elements would better serve the users.

An entity that hosts the electronic catalog and the elements therein may merge such tags itself, may enable the users to merge the tags, or may implement some combination thereof. This entity (e.g., servers of a merchant website or a web service) or another entity may first determine one or more tags that are logically related to a particular tag. The hosting entity (or another entity) may make these determinations in multiple ways. For instance, the hosting entity may utilize keyword-to-keyword similarity data. That is, the hosting entity may determine which keywords are often employed at a time near one another when users search for elements in the electronic catalog. For instance, if users often conduct a search (e.g., tag search) for "Digital Camera" sometime near when the users search for "Digital Cameras", then these search terms may be deemed logically related. Because these search terms are now related, these search terms may now also be considered related when the search terms are used as tags. Additionally, the hosting entity may examine elements associated with two or more tags. If the entity determines that a sufficient overlap between elements exists, then the entity may deem the tags related. The hosting entity may also utilize stemming techniques, as well as multiple other techniques, to determine tags that are logically-related to the particular tag.

Once the hosting entity determines a collection of tags that are related to a particular tag, the entity may present these tags (and potentially other non-related or arbitrary tags) to users. The hosting entity may also enable the users to vote on whether or not the particular tag should be merged with one of the presented tags. Additionally, the hosting entity may enable the users to vote on a direction in which to merge the tags. In these instances, the users are able to vote to merge the particular tag with one of the presented tags, but may not be able vote to merge the particular tag with a tag that the hosting entity does not present.

Based at least in part on user input, the hosting entity may then choose to merge the particular tag with one of the presented tags. As such, each element associated with the particular tag and the selected tag become associated with a same tag, such as the particular or selected tag. Thereafter, when a user searches for either the particular tag or the selected tag, the hosting entity may return a collection that includes elements that have been associated with the particular tag as well as elements that have been associated with the selected tag.

Additionally, note that the hosting entity may present these tags for merging on multiple pages, such as a page that is associated with the particular tag. For instance, the hosting entity may suggest these tags for merging while the user views a page that illustrates elements associated with the particular tag. That is, if a user views a page illustrating elements associated with the tag "Digital Cameras", the hosting entity may present the tag "Digital Camera" to enable the viewing user to vote to merge these two tags.

Finally, also note that the hosting entity may choose to undo a tag merge in some instances. That is, imagine that a first tag has been merged into a second tag. Some time after this merge, the hosting entity may decide that the two original tags should remain separate. Responsive to this determination, the entity may separate (i.e. "unmerge") the tags, such that each tag is again a distinct tag. Additionally, the hosting entity may maintain a list of tags that should be merged. For instance, the entity may determine, either before or after the unmerge process, that the first tag and the second tag should be not merged. The entity may therefore disallow merging of these two tags into a single tag.

For purposes of discussion, tag merging is described in the context of an item catalog hosted by a merchant website. One illustrative implementation of this environment is provided below. However, it should be appreciated that the described tag-merging techniques may be implemented in other environments. Such environments might include websites or other destinations related to, for example, social networking, news reporting, community forums, media sharing, among any other environment that can utilize tagging technology.

Illustrative System Architecture

FIG. 1 depicts an illustrative architecture 100 in which tag merging may be implemented. In architecture 100, one or more customers 102 may utilize user computing devices 104(1), ..., 104(M) to access a website 106 via a network 108. Network 108 represents any one or combination of multiple different types of networks, such as cable networks, the Internet, and wireless networks.

One or more servers 110(1), ..., 110(N), perhaps arranged in a cluster or as a server farm, host website 106. Other server architectures may also be used to host the site. Website 106 is capable of handling requests from many users and serving, in response, various web pages that can be rendered at user computing devices 104(1)-(M). Website 106 can be any type of website that supports user interaction, including online retailers, informational sites, social networking sites, blog sites, search engine sites, news and entertainment sites, and so forth.

In the illustrative environment, website 106 represents a merchant website that hosts an electronic catalog with one or more items. An item includes anything that the merchant wishes to offer for purchase, rental, subscription, viewing, informative purposes, or some other form of consumption. In some embodiments the item may be offered by the merchant for consumption. However, in some embodiments the merchant may host items that others are selling using the merchant's website. An item can include a product, a service, a digital download, a news clip, user-created content, information, or some other type of sellable or non-sellable unit.

In FIG. 1, the electronic catalog is represented as an item catalog 112, which stores a collection of item records 114. Item catalog 112 is accessible, directly or indirectly, by one or more of servers 110(1)-(N). Some or all of item records 114, meanwhile, represent an associated item being offered for sale on website 106 and contains information about the associated item. For products such as books or music CDs, for example, the item record may contain a description, images of the product, author/artist names, publication data, pricing, shipping information, and so forth. For other types of items, the item record may contain different information appropriate for those items. Hereafter, the term "item" may be used interchangeably with the term "item record".

An item manager 116 facilitates access to and management of item records 114 in item catalog 112. Item manager 116 allows the website operators to add or remove items to or from item catalog 112, and generally maintain control of the items presented on website 106. When a user requests information on an item from website 106, one or more of servers 110(1)-(N) retrieve the item information from item catalog 112 and serve a web page containing the information to the requesting user computing device. Item catalog 112 may therefore contain static web pages that are pre-generated and stored prior to such requests, or may alternatively store data that is used to populate dynamic web pages that are generated in response to such requests.

In addition, each item record 114 within item catalog 112 may be associated with one or more tags. For instance, an illustrative item record 118 (illustrated as representing a digital camera) is shown to be associated with tags 118(1), ..., (P). Customers 102, an operator of website 106, or some other entity may have associated tags 118(1)-(P) with item record 118. By associating a tag with an item record, the tag also becomes associated with the item that the item record represents. As discussed above, tags 118(1)-(P) may comprise pieces of information that characterize or otherwise describe attributes of the item represented by item record 118. In some embodiments, tags may also include information that does not describe attributes of the item. For example, a user may tag an item "Mom" to indicate items that might be a good gift for the user's mother.

FIG. 1 also depicts that servers 110(1)-(N) include, or have access to, a related tag engine 120 and a tag-merging engine 122. Related tag engine 120, which includes a keyword-to-keyword tool 124 and an item overlap tool 126, determines one or more tags that are logically related to a particular tag. This engine determines relatedness in multiple ways, as described in detail below. Once this engine determines the related tags, tag-merging engine then presents, via a presentation tool 128, the logically-related tags to a user (e.g., one of customers 102) of website 106 to enable the user to vote to merge the particular tag with one or more of the logically-related tags. In some instances, the user may only merge the particular tag with one of the tags presented by tag-merging engine 122. In response to the user's vote and/or in response to some other activation, tag-merging engine 122 merges the particular tag with the selected logically-related tag. The particular tag may merge into the logically-related tag, the logically-related tag may merge into the particular tag, each tag may merge into the other, or both tags may merge into a new tag.

As discussed above, one or more of customers 102 may access web pages, such as a web page 130 on website 106, that include items associated with a particular tag. From these pages, the user may choose to vote to merge a particular tag with another tag. To access the web pages that website 106 hosts, customers 102 may utilize user computing devices 104(1)-(M) (also referred to as "client computers" or simply "clients"). User computing devices 104(1)-(M) may be implemented as any number of computing devices, including personal computers, laptop computers, portable digital assistants (PDAs), mobile phones, set-top boxes, game consoles, and so forth. As illustrated, each user computing device is equipped with one or more processors 132 and memory 134 to store applications and data.

According to some embodiments, a browser application 136 is stored in memory 134 and executes on a processor 132 to provide access to website 106. Browser 136 renders web pages served by website 106 on an associated display. In addition to a user navigating via browser 136, other software applications (browsers or otherwise) could likewise operate to receive and present web page 130. Note also that while the above embodiments are described in the context of a web-based system, other types of client/server-based communications and associated application logic could be used.

When a user (e.g., one of customers 102) accesses website 106, user computing device 104(1) submits a request, such as in the form of a uniform resource locator (URL), to servers 110(1)-(N). Upon receiving the request, servers 110(1)-(N) return web page 130 back to the requesting client computer in the illustrated implementation. In the context of a merchant website, returned web page 130 may include items associated with a particular tag such as "Digital Cameras". Web page 130 may also present to the user one or more tags with which the particular tag may be merged. Web page 130 may then allow the user to vote to merge one or more of these tags with the particular tag.

Figure 2:
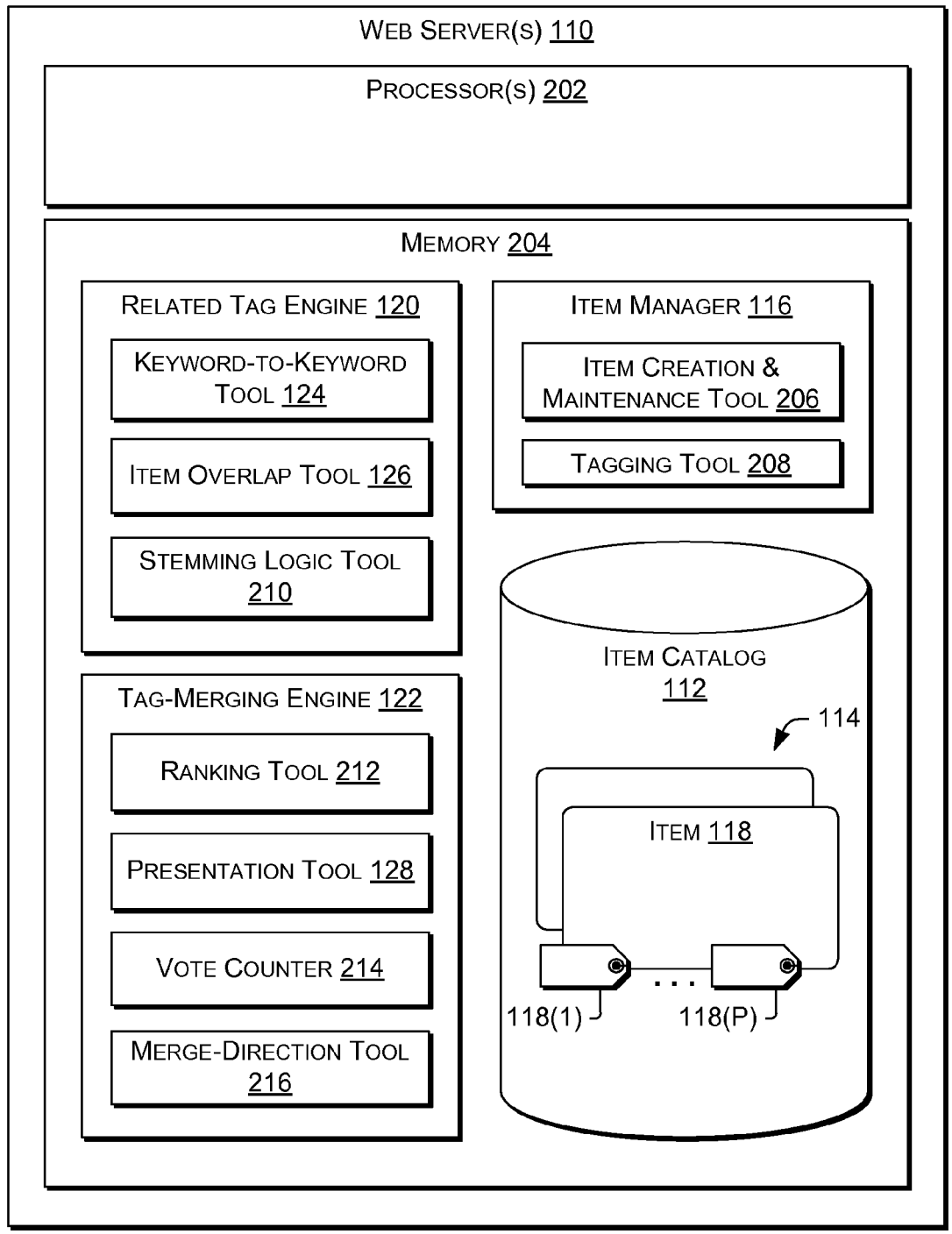
FIG. 2 is a block diagram illustrating embodiments of modules in an item manager, a related tag engine, and a tag-merging engine from FIG. 1.
Figure 9:
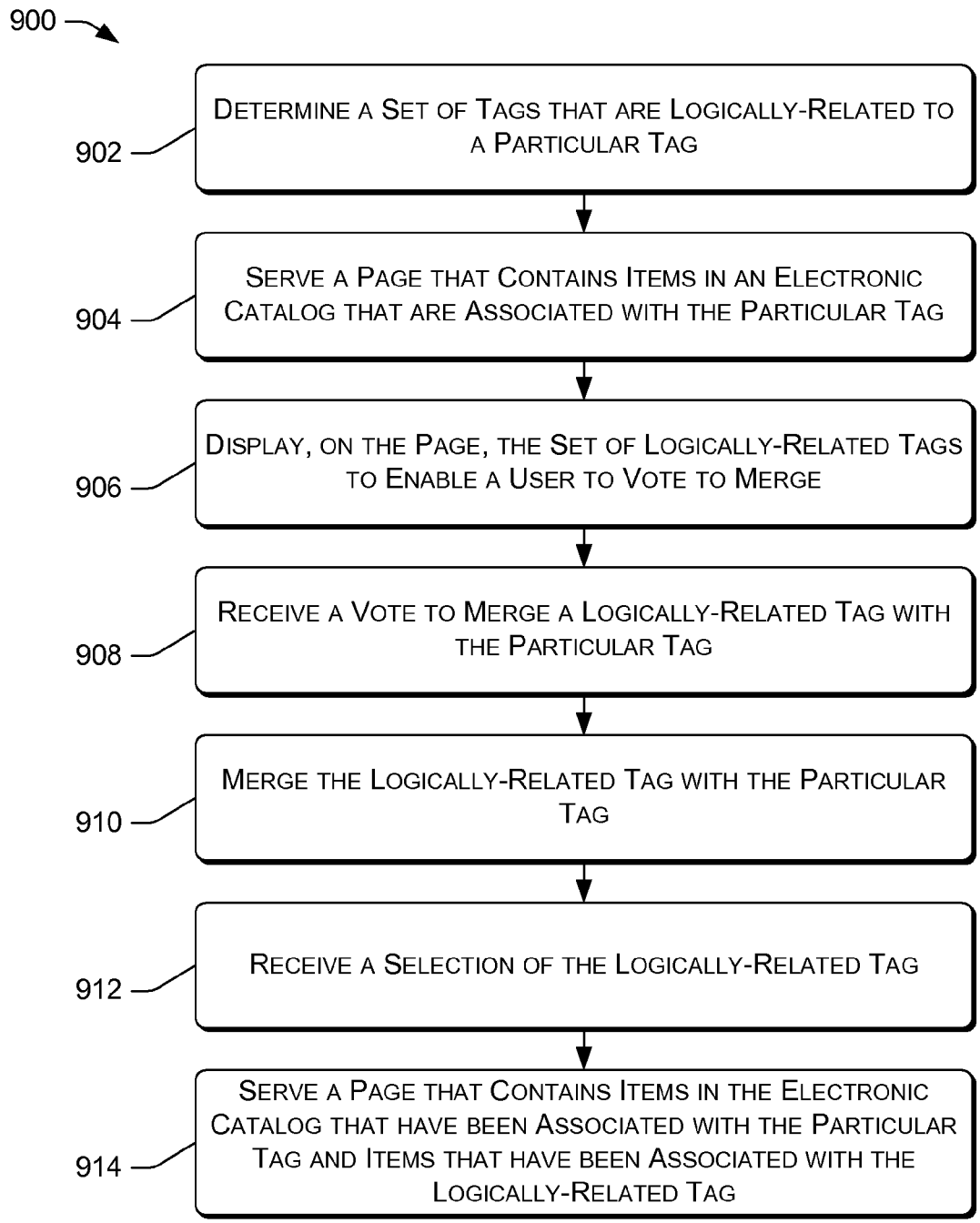
FIGS. 9-11 are flow diagrams of illustrative processes of implementing tag merging.
Figure 10:
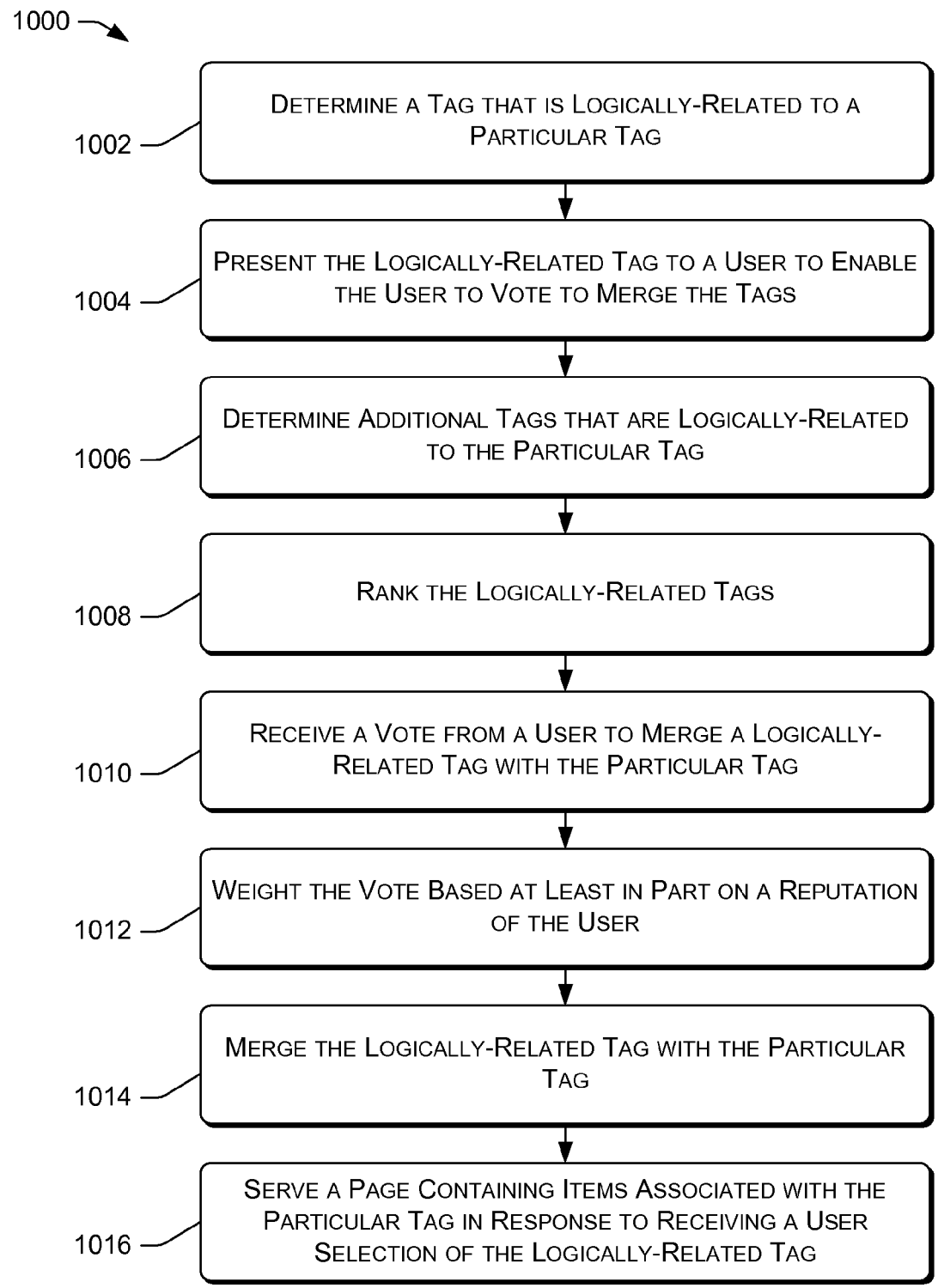
Figure 11:
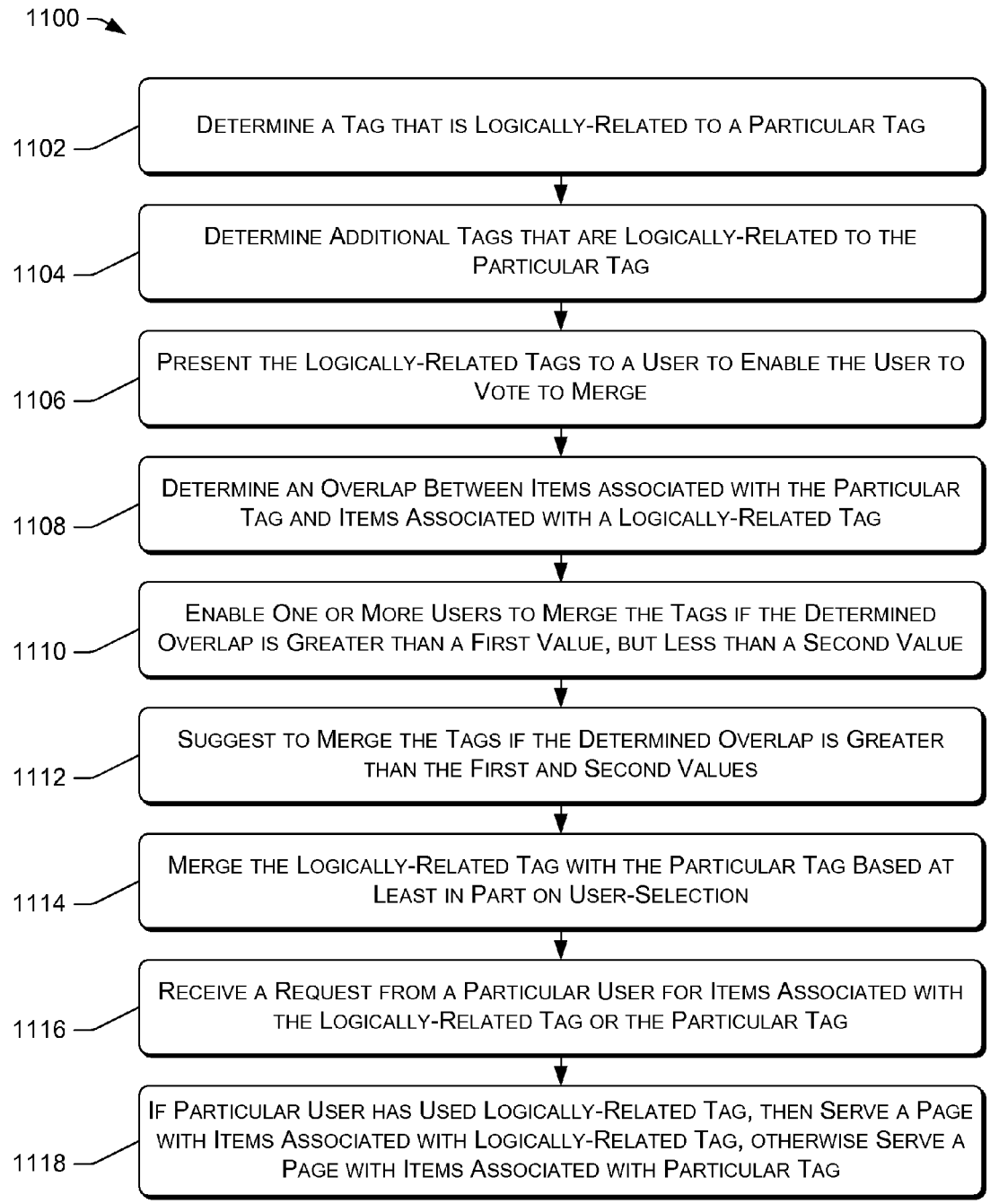

Next, FIG. 2 and an accompanying discussion illustrate and describe an illustrative tag-merging system. Thereafter, FIGS. 3-8 and an accompanying discussion illustrate and describe example scenarios where two tags may merge into a single tag. Finally, FIGS. 9-11 depict illustrative processes that implement tag-merging techniques.

Illustrative System Components

FIG. 2 illustrates example implementations of components of a tag-merging system, including components of related tag engine 120 and tag-merging engine 122. These engines and their components may run as software on one or more of web servers 110(1)-(N). The web servers have processing capabilities and memory suitable to store and execute computer-executable instructions. In this example, web server(s) 110 include one or more processors 202 and memory 204. Memory 204 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Item manager 116 and engines 120 and 122 are implemented as software or computer-executable instructions stored in memory 204 and executed by one or more processors 202. Item manager 116 includes an item creation and maintenance tool 206 to facilitate creation and maintenance of item records 114 in item catalog 112. Such items may be created and posted by the website operator (e.g., an owner of a merchant website), the manufacturer, distributor, retailer, or the like. Item manager 116 further includes a tagging tool 208 that enables a user (e.g., one of customers 102) to associate one or more tags with an item within item catalog 112. Tagging tool 208 may also enable the user to first define one or more of these tags.

Related tag engine 120, meanwhile, may include a multitude of modules that may, alone or in any combination, determine one or more tags that are logically related with a particular tag. Related tag engine 120 includes keyword-to-keyword tool 124 and item overlap tool 126, both briefly discussed above. Keyword-to-keyword tool 124 analyzes users' search patterns and, with these patterns, determines relationships between keywords used to search for items 114 in item catalog 112. Tool 124 may employ some or all of the techniques described in U.S. Pat. No. 7,953,740, filed Feb. 13, 2006 and issued on May 31, 2011, the disclosure of which is herein incorporated by reference in its entirety. For instance, tool 124 determines which keywords are typically used near in time to one another. This amount of time may be a time spent in a particular session, which may comprise a set amount of time (e.g., 30 minutes, an amount of time that a typical customer searches for an item, etc.), or this amount of time vary depending on a type of item being searched for or the like. Tool 124 may also determine a number of users who search for the two or more keywords within this time frame. As such, tool 124 may base keyword-relatedness on a time between searches with a respective keyword, as well as a number of users that search for these keywords within a certain time frame.

For instance, imagine that users commonly search for items associated with a tag "Digital Camera" and shortly thereafter (e.g., immediately thereafter) search for items associated with a tag "Digital Cameras". Based on this common pattern, keyword-to-keyword tool 124 may determine that that these keywords (and hence the tags) are related to one another. As discussed above, tag-merging engine 122 may accordingly enable users to vote to merge these tags together.

In addition, keyword-to-keyword tool 124 may determine related tags by determining which keywords, when searched, often result in a user choosing a common page such as a page associated with a certain item. For instance, imagine that a first user conducts a search for "digital cameras" and, responsive to the search, selects a link to a page associated with a certain digital camera. Imagine also that a second user conducts a search for "photography" and, responsive to this search, also navigates to (e.g., by selecting the same link) the same page that associated with the certain digital camera. If many users navigate to this page (or other common pages) based on searches for these keywords, then tool 124 may deem the keywords related. When the keywords are used as tags, tool 124 may thus also deem the tags related.

In addition to tool 124, related tag engine 122 may employ item overlap tool 126, which determines one or more related tags by analyzing items associated with the tags. In regards to a particular tag, for instance, tool 126 may seek to determine an overlap between items associated with the particular tag and items associated with other tags. If this overlap is greater than a certain threshold, then tool 126 may deem the particular tag and the other tag(s) as related. In some instances, tool 126 first determines a percentage of items that are associated with the particular tag that are also associated with another tag. If this percentage is greater than a certain threshold (e.g., >33%, >50%, >75%, >90%, >95%, etc.), then item overlap tool 126 may deem the tags related. Similarly, tool 126 may determine a percentage of items that are associated with the other tag that are also associated with the particular tag. Again, if this percentage is greater than a certain threshold, then item overlap tool 126 may deem these tags as related. Tool 126 may also implement both analysis to determine whether one tag is a subset of another, or whether users appear to deem the tags as relative equals.

Furthermore, tool 126 may implement other thresholds before deeming tags as related. For instance, tool 126 may require a certain percentage overlap as well as a certain number (e.g., 10, 100, 10,000, etc.) of overlapping items. For instance, imagine that a tag "Trail Running Shoes" is associated with six items. Imagine also that a tag "Great Outdoor Product" is similarly associated with six items, five of which are common to the "Trail Running Shoes" tag. Here, while the overlap may be relatively high in percentage terms (five of six, or 83%), the number of overlapping items may be relatively low (here, five items). As such, tool 126 may determine that the threshold of overlapping items has not been met and, hence, that the tags should not be deemed related.

With this overview of one illustrative implementation of item overlap tool 126 in mind, one specific example is now provided. To determine whether tags are related, tool 126 may first attempt to create a list of potentially related tags that are equivalents of one another, a list of potentially related tags where one tag (e.g., a name of a movie) is a "narrower" than another (e.g., the tag "movie"), and a list of potentially related tags where one tag (e.g., the tag "children books") is broader than another (e.g. a name of a children book). Tool 126 may create this lists "offline", storing them in a database and refreshing them periodically, or tool 126 may create these lists "online" on a per-request basis. Once these lists are created, tool 126 may deem some number (e.g., a set number or a varying number based on a threshold relatedness value) of the listed tag pairs as logically related. In this specific example, tool 126 employs three phases to determine logically-related tags for the purpose of merging tags.

Phase 1: Find Most Correlated Tags

In this phase, tool 126 is to discover what tags are considered as "most related" to an input tag "T1". As described above, tool 126 determines these tag relationships through item overlapping: a measure of the strength of the co-presence of two given tags on a given item. For example, suppose that 100 users have placed various tags on an item representing a book on nutrition (called ITEM1). Suppose that of those tags, ITEM1 has been tagged "health" twenty times and "vegetarianism" ten times. As such, E(health, vegetarianism, ITEM1)=20/100*10/100=2%, measuring co-presence from a probability/statistics point of view (like two independent events). The sum of the values computed as above for some or all of the items in item catalog 112 would give a measure of how the strength of the relationship between the tags "health" and "vegetarianism".

One model that tool 126 may employ to determine these strengths is a bipartite graph G=(T+I, A) where the disjoint sets correspond to the multitude of some or all tags and the multitude of some or all items. Here, a (t, i) edge exists if there exists a user "u" that has placed the tag "t" on the item "I". A labeling function is also introduced as 1:A→A, where 1(ti) ="the number of users that have placed that tag t on the item i".

In phase 1, tool 126 seek-out tags that are most correlated with the input tag T1, in the sense that they coexist on the maximum number of items. For a given item i and an arbitrary tag t', the strength of the coexistence of T1 and t' on the item i is an expression E(1(T1i), 1(t'i), i). The strength of the global correlation between T1 and t' is defined as the sum of E(1 (T1i), 1(t'i), i), for all items i. The expression E(m, n, i) (where m=1(T1i), or the number of users that have placed the tag T1 on the item i, and n=1(t'i), or a tag t on item i). has taken various forms until now. The best proposal achieved is the expression E(m, n, i)=m*n/t*t, where t is the total number of times that item i has been tagged. In some instances, this makes every E(m, n, i) expression sub-unitary and may reduce the influence of "accidental associations", where many users associate two tags on only one item. For instance, if many users would tag a book entitled "The Da Vinci Code" with "Jesus" and "code", it wouldn't mean that the two tags are strongly related out of the item's context. E may therefore take relative frequencies into account.

After this sum is calculated, the visited tag multitude T' is sorted by the sums explained above. In some instances, a set number "L" (e.g., 10, 30, 1000, etc.) of sorted tags proceed to phase 2. This measure may help to reduce the execution time.

Phase 2: Determine T1–t' Relationship Indicators for the L Tags

Once the L potentially-related tags are found in phase 1, the nature of the relationship between tag T1 and these L tags may be examined. As discussed above, this phase may help to determine, for some or each of the L tags, whether that tag is narrower, broader, or approximately equivalent to tag T1. To do so, a strength score may be attached to each of these relationship types. The scores may then be used in phase 3 to construct the final lists.

One model for portraying this phase is a dotted plot. For each (T1, T2) pair (where T2 is one of the L tags), some or all of the items that have been tagged at least once with T1 or T2 may be plotted. The x and y coordinates may be the 1(T 1i)/t1 and 1(T2i)/t2 relative frequencies discussed in phase 1, also in the [0, 1] interval. The shape and characteristics of resulting cloud may then be indicators of the relationship that exists between the two tags T1 and T2. In statistics, various means of correlation detection have been described for such clouds. In some instances, the x>=0, y>=0 semi-plane (top-right quadrant) can be seen as divided in five "cones", each of a, for example, PI/10 angle. The number of points in the one, three, and five cones ([0,PI/10], [2PI/10,3PI/10], [4PI/10,5PI/10]) may then be counted. Cone one represents those items that are "more T2 than T1", meaning that T2 may be broader than T1. Cone three, meanwhile, corresponds to T1 and T2 being approximate equivalents. Cone five, then, corresponds to T2 being narrower than T1. These three numbers may be used for determining the strength of each relationship for a (T1, T2) pair. A set of formulas may then be applied to determine nominal scores for each relationship's strength.

Phase 3: Classify the Tags, Integrate Semantical Analysis, Create Final Lists

Once the relationships between T1 and the L related tags have been found (e.g., numerical scores have been calculated for likeliness that each (T1, T2) tag pair is a "narrower", "broader", or "approximate equivalents" tag pair), it may be decided whether a given tag makes it into one of the three lists or is eliminated altogether. To achieve this, a statistic normalization of the three series of values may be performed, along a normal curve. To improve the quality of the results, stemming logic tool 210 (discussed in detail below) may integrate a degree of semantic analysis. If a dictionary entry exists for T1 and one of the tags found above is a known hyponym, hypernym, or synonym, the corresponding score of that tag pair may be increased relative to other tag pairs whose second tag is not a grammatically related to tag T1. If, however, the category does not match the relationship category (e.g., a tag T2 is found to be a hypernym of tag T1, but T2 is found to be narrower than T1 during phases 1 and 2), then the score for this tag pair may be decreased.

A statistical threshold based on the median may then be computed, with all values lower than the statistical threshold being eliminated. The remaining sets may then be analyzed, and tags that are present in two or more categories may ultimately be elected in the list they have the highest ranking in. Remaining tags from these three lists may then be deemed "logically-related" and may be presented to users to vote to merge these tags into a single tag. These lists may also be utilized to determine whether to merge the tags a certain direction, or whether to suggest to merge the tags a certain direction.

In addition to item overlap tool 126, related tag engine 120 includes a stemming logic tool 210 to help determine related tags. Stemming logic tool 210 may employ known and/or novel stemming techniques to help determine whether two or more tags are related. Stemming, meanwhile, is a process for reducing inflected or derived words to their stem or root. These stemming techniques may include analyzing a particular tag and one or more other tags to determine a common root. For instance, imagine that stemming logic tool 210 analyzes the tags "Digital Cameras" and "Digital Camera". With such analysis, tool 210 may determine that these tags contain a common root of "Digital Camera". The determination of this relatively strong root may cause tool 210 to deem these tags as related.

Stemming logic tool 210 may also analyze the particular tag and/or the one or more other tags to determine grammatical variations of the tags. These variations may include determining misspellings, plural forms, hyphens, abbreviations, acronyms, and the like. Responsive to determining that two tags are merely grammatical variations of the same term, tool 210 may deem these tags as related. Again, tool 210 may come to such a conclusion after analyzing "Digital Camera" (singular) and "Digital Cameras" (plural). Of course, while a few specific examples have been given, tool 210 may employ multiple other techniques, some of which may be well known to those skilled in the art.

While in some instance tool 210 may use its analysis to deem tags as related, in other instances this tool may be used, in combination with other techniques, to authenticate that tags are related. For instance, imagine that a large overlap exists between items associated with "Digital Camera" and "Digital Cameras", as well as between "Digital Cameras" and "Photography". Stemming tool logic 210 may then be consulted for analysis. Here, tool 210 may determine that the former combination should be deemed related while the latter combination should not be so deemed. As such, related tag engine 120 may deem "Digital Camera" and "Digital Cameras" as related, but not "Digital Camera" and "Photography".

Finally, note that while a few illustrative modules have been illustrated and discussed, related tag engine 120 may similarly implement multiple other non-illustrated modules to determine logically-related tags.

Once related tag engine 120 determines one or more tags that are logically related to a particular tag, tag-merging engine enables users to vote to merge the logically-related tags with the particular tag. As illustrated, tag-merging engine 122 includes a ranking tool 212, presentation tool 128, a vote counter 214, and a merge-direction tool 216. Similar to related tag engine 120, however, tag-merging engine 122 may additionally or alternatively include non-illustrated modules. Also similar to related-tag engine 120, the modules within tag-merging engine 122 may act singularly or in any combination.

Ranking tool 212 serves to rank, for a particular tag, the logically-related tags determined by related tag engine 120. This rank may be based on a relatedness of each tag to the particular tag, a popularity of each tag, or any other factor or combination of factors. For example, imagine that related tag engine 120 determines that both the tags "Digital Camera" and "Digital Photography" are related to the tag "Digital Cameras". Ranking tool 212 may determine that, of these two related tags, the former is most related to "Digital Cameras" due to a common root. As such, ranking tool 212 may rank "Digital Camera" above "Digital Photography". Conversely, ranking tool 212 may determine that more of customers 102 purchase items within item catalog 112 responsive to a tag search for "Digital Photography". As such, ranking tool 212 may rank this tag above "Digital Camera".

However these related tags are ranked, presentation tool 128 receives the logically-related tags and presents some or all of them to one or more users to enable the users to vote to merge one or more of these tags with the particular tag. For instance, presentation tool 128 may present tags "Digital Camera" and "Digital Photography" to a user viewing a page associated with the tag "Digital Cameras". Presentation tool 128 may present these tags in a drop-down menu, as a tag cloud, in a list, or in any other visual or non-visual manner. In instances where ranking tool 212 has ranked these tags, presentation tool 128 may present these tags in a manner to indicate this rank. For instance, tool 128 may present these tags in a ranked list. Presentation tool 128 may also illustrate logically-related tags in other ways, such as by illustrating logically-related tags having higher ranks with increasing fonts, boldness, or contrasting color, for example.

Presentation tool 128 may present the logically-related tags in such a manner as to merely enable (i.e., give the option to) users to merge the tags with a particular tag. Additionally, presentation tool 128 may present these tags in such a way as to actually suggest that the particular tag be merged with one or more other tags. For instance, presentation tool 128 may enable a user to merge the tags if an item overlap is greater than a first threshold value (e.g., 70%) but less than a second threshold value (e.g., 90%). If, however, the item overlap is greater than both threshold values, then presentation tool 128 may actually suggest the merge. Here, this tool may not only enable users to vote to merge the suggested tags, but may also enable the users to vote against the suggested merge.

Once the logically-related tags are presented, vote counter 214 counts votes for and/or against merging the particular tag with one or more of the logically-related tags. Vote counter 214 may also weigh particular users votes based on a reputation of each respective user. This reputation may be based, in some instances, on a particular user's past behavior on website 106. If, for instance, the particular user has a relatively high reputation within website 106 and/or within the tagging community, then vote counter 214 may weight that particular user's vote heavily relative to other users. The converse may be true for users with relatively low reputations. Additionally, users with low reputations may not be allowed to vote at all.

In some instances, a single user vote to merge the particular tag with the logically-related tag may be enough to merge the tags. In other instances, tag-merging engine 122 may implement other thresholds. These illustrative thresholds may include, for instance, a certain number of users voting to merge the tags. Here, the number of required votes may relate to (e.g., increase with) a number of items associated with the particular tag and/or the logically-related tag(s). That is, merging tags associated with a relatively large collection of items may require a relatively high number of votes. Furthermore, in instances where users are able to vote for or against a merge, tag-merging engine 122 may merge the tags where a certain percentage (e.g., 67%) of users vote for the merge as opposed to against the merge.

Finally, merge-direction tool 216 determines whether to merge a logically-related tag into a particular tag, whether to merge the particular tag into the logically-related tag, whether to merge each tag into the other, or whether to merge the tags into a third tag. When the logically-related tag merges into the particular tag, each item previously associated with the logically-related tag may become associated (or "tagged") with the particular tag. Additionally, each of these items may or may not become disassociated with the logically-related tag. In either instance, when a user searches for items associated with the logically-related tag (e.g., "Digital Photography") after the merge, website 106 will return a listing of items that are associated with the particular tag (e.g., "Digital Cameras").

In some instances, however, both tags may merge into one another. Here, each item associated with the particular tag becomes associated with the logically-related tag as well, and vice versa. Therefore, each collection of items associated with each of the two tags become identical. Finally, these tags could potentially merge into a third new tag that differs from both the logically-related tag and the particular tag. Here, the items may or may not become disassociated with the particular tag and/or the logically-related tag.

In some instances, tool 216 determines a merge direction with reference to user input, while in other instances, tool 216 automatically makes this determination. In the former instances, presentation tool 128 enables users to vote on a direction of the merge. In the latter instances, meanwhile, tool 216 may base a merge direction on multiple factors. For instance, tool 216 may merge the tag with a fewer number of associated items into the tag associated with the greater number of items. Conversely, tool 216 may merge the tag that has been used by fewer users into the tag that has been used by a greater number of users. Furthermore, in instances where related tag engine 120 determines that one tag is associated with a collection of items that is a subset of another tag's collection of items, then tool 216 may merge the former tag with the latter tag. Finally, tool 216 may merge the tag that receives a fewer number of views, or which results in a fewer number of item purchases, into the tag that receives a greater number of view or results in a greater number of purchases.

Again, merge-direction tool 216 may also choose a merge direction based on user input. Here, tool 216 may merely allow users a free ability to choose a direction to merge two or more tags. Alternatively, presentation tool 128 and merge-direction tool 216 may suggest a certain merge direction in some instances. For instance, these tools may suggest that a tag that is associated with a subset of items be merged into a tag that is associated with the superset of items.

In sum, related tag engine 120 includes multiple modules to determine one or more tags that are logically-related to a particular tag. With this relationship, tag-merging engine 122 may present these tags to users to vote to merge the particular tag with one or more of the logically-related tags. Responsive to these votes attaining one or more thresholds, tag-merging engine may 122 merge one or more of the logically-related tags with the particular tag.

Once a selected tag is merged into the particular tag, the items associated with the selected tag become associated with the particular tag, while the selected tag may or may not be disassociated from these items. Additionally, a mapping may be created between the particular tag and the selected tag, such that the two tags essentially comprise a single tag. This mapping may be utilized when a user applies the selected tag to an item or when the user searches for the selected tag. For instance, if, after the merge, a user tags an item with the selected tag ("Digital Camera"), website 106 may actually associate the particular and merged tag ("Digital Cameras") with the item. Additionally, when a user searches for items associated with the selected tag (e.g. "Digital Camera") after this tag has merged with the particular tag, website 106 may serve a page that illustrates items that have been associated with the selected tag, as well as items associated with the particular tag (e.g., "Digital Cameras").

Website 106 may also vary the tag that is presented to a user. For instance, website 106 may determine, for a particular user, whether the particular user previously used (e.g., "tagged" items with) the selected tag. If the website determines that the particular user did indeed employ this tag (once or a threshold number or percentage of tags), then the website may present this tag to the particular user in some instances. Website 106 may, for instance, continue to illustrate the selected tag on pages viewable via the user's account (i.e., private pages). For instance, if the user views a page that lists the items tagged by the user, this page may depict the selected tag ("Digital Camera"). If, however, the user actually views a public page outside of the user's account (e.g., the user searches for items tagged with the selected tag and clicks a corresponding link), this page may illustrate items as being tagged with the particular tag ("Digital Cameras"). If the website determines that the particular user has not used the selected tag, meanwhile, then the website may serve both public and private pages that employ the particular tag ("Digital Cameras").

Illustrative Tag Merging Techniques

Figure 3:
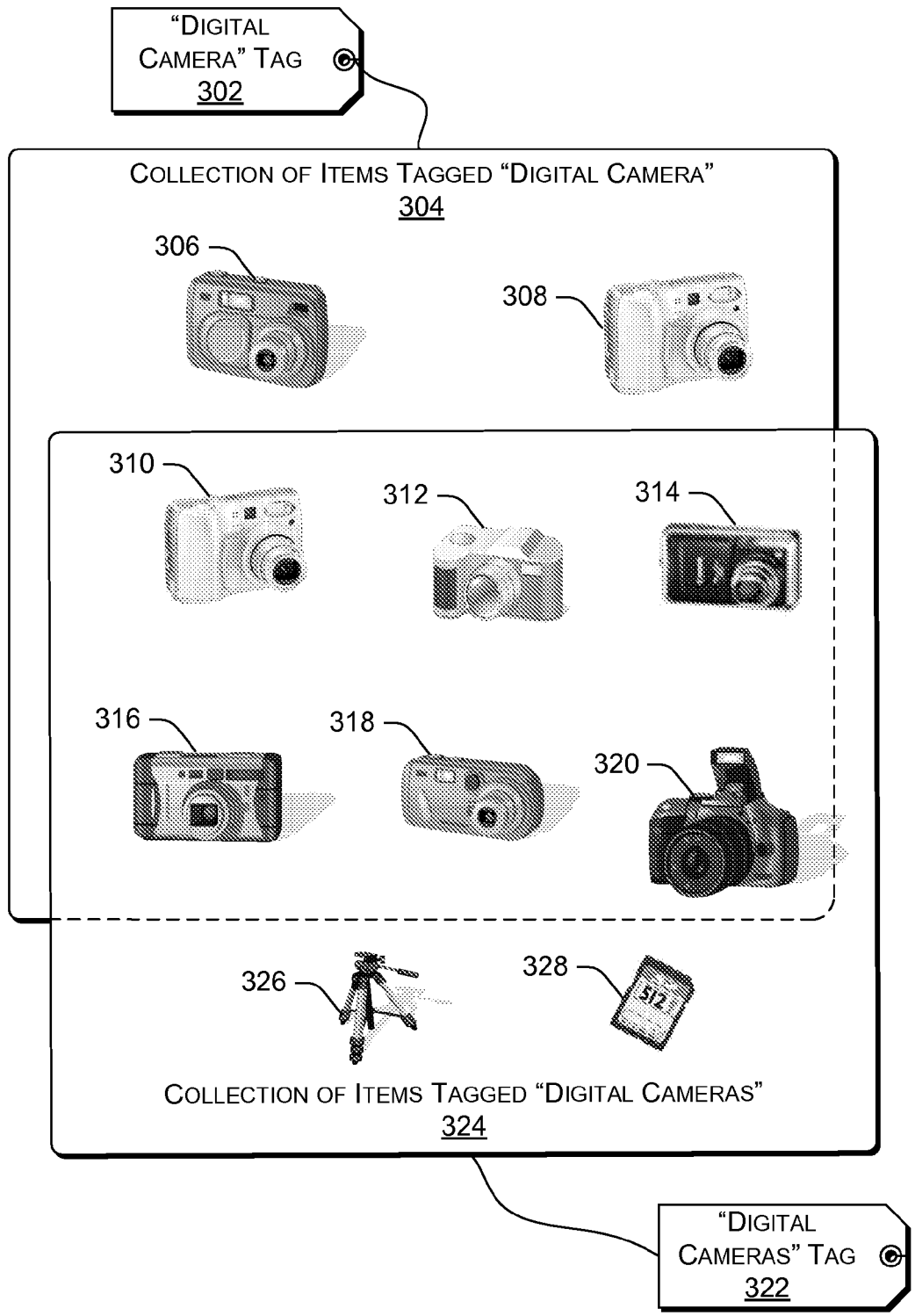
FIG. 3 depicts an illustrative implementation of two tags, each being associated with multiple items in an electronic catalog. As illustrated, an overlap exists between the items associated with each of the two tags.

FIG. 3 depicts an illustrative implementation of two tags, each being associated with multiple items in an electronic catalog. As illustrated, a "Digital Camera" tag 302 is associated with a collection of items 304 having been tagged "Digital Camera". Collection of items 304 includes multiple cameras 306, 308, . . . , 320. A "Digital Cameras" (plural) tag 322, meanwhile, is associated with a collection of items 324 having been tagged "Digital Cameras". Collection of items 324 includes cameras 310-320, as well as a tripod 326 and a memory card 328. While these tags may be associated with multiple other items in item catalog 112 in many instances, collections of items 304 and 324 are illustrative in describing tag merging techniques.

As illustrated, an overlap exists between items within collection of items 304 and items within collection of items 324. Specifically, each of cameras 310-320 has been tagged both "Digital Camera" and "Digital Cameras". Here, item overlap tool 126 may serve to determine whether this overlap meets certain threshold criteria so as to determine the tags as related (or sufficiently related). Additionally, keyword-to-keyword tool 124 may analyze keyword-to-keyword similarity data, while stemming logic tool 210 may analyze a root or grammatical variations of the tags to determine relatedness or a lack thereof. Here, imagine that related tag engine 120 determines that tag 302 and tag 322 are approximately equivalent terms, and hence each tag is logically related to the other.

Figure 4:
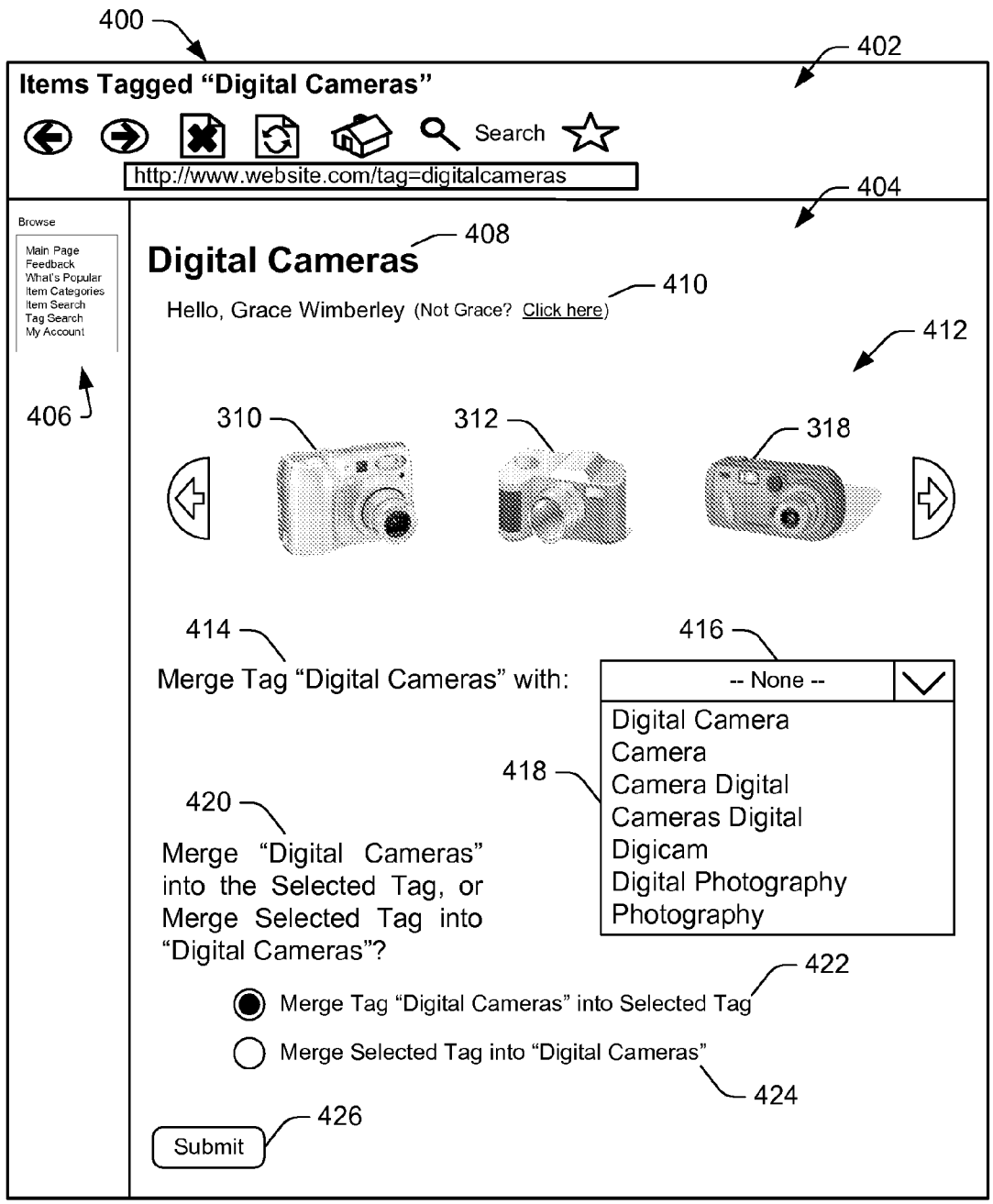
FIG. 4 is a screen rendering of an illustrative page for implementing tag merging. This illustrative page includes items within an electronic catalog that have been associated with a tag entitled "Digital Cameras".

With this in mind, FIG. 4 illustrates a screen rendering of a page 400 for implementing tag merging. Here, page 400 includes items within item catalog 112 that have been associated with tag 322 entitled "Digital Cameras". Website 106 may serve this page, for instance, in response to a user selecting a hyperlink associated with "Digital Cameras" tag 322 or in response to the user conducting a tag search for "Digital Cameras".

As illustrated, page 400 includes a browser toolbar 402 and a content area 404. Browser toolbar 402 enables a user of the merchant website to navigate to pages of the website such as page 400. Content area 404, meanwhile, includes a menu 406, a title 408, and a greeting 410. Menu 406 includes multiple links to web pages hosted and served by the merchant website. Title 408 entitles page 400 as "Digital Cameras", which is the name of the currently-highlighted tag. Greeting 410, meanwhile, identifies the user ("Grace Wimberely") currently signed in to website 106.

Content area 404 also includes an inventory 412 of items within item catalog 112 that have been tagged "Digital Cameras". Here, inventory 412 comprises a collection of items 304. In the illustrated implementation, a user viewing page 400 may navigate through inventory 412 by actuating the illustrated left and right arrow icons.

Additionally, content area 404 includes an area 414 to enable the user to vote to merge the tag 322 ("Digital Cameras") with one or more logically-related tags. Here, the user actuates a drop-down menu 416 to view a list 418 of logically-related tags from which the user may choose one (or potentially more) to merge with tag 322. As illustrated, list 418 includes tags entitled "Digital Camera" (tag 302), "Camera", "Camera Digital", "Cameras Digital", "Digicam", Digital Photography", and "Photography". Presentation tool 128 may have ranked these tags according to ranks provided by ranking tool 212, or tool 128 may list these tags in some other manner (e.g., alphabetically, arbitrarily, etc.).

Content area 404 further includes an area 420 to enable the user to choose a direction in which to merge tag 322, assuming the user chose to vote to merge the tag at all. Here, the user may select an area 422 that states "Merge Tag 'Digital Cameras' into Selected Tag", or the user may select an area 424 that states "Merge Selected Tag into Digital Cameras". Here, the user has selected area 422 and, as such, wishes to merge tag 322 into the selected logically-related tag from list 418. Finally, content area 404 includes an icon 426 that, when actuated, submits the user's vote to merge the tags to website 106. While page 400 depicts an illustrative manner of enabling a user to merge tags, multiple other implementations may be employed and are similarly envisioned.

Figure 5:
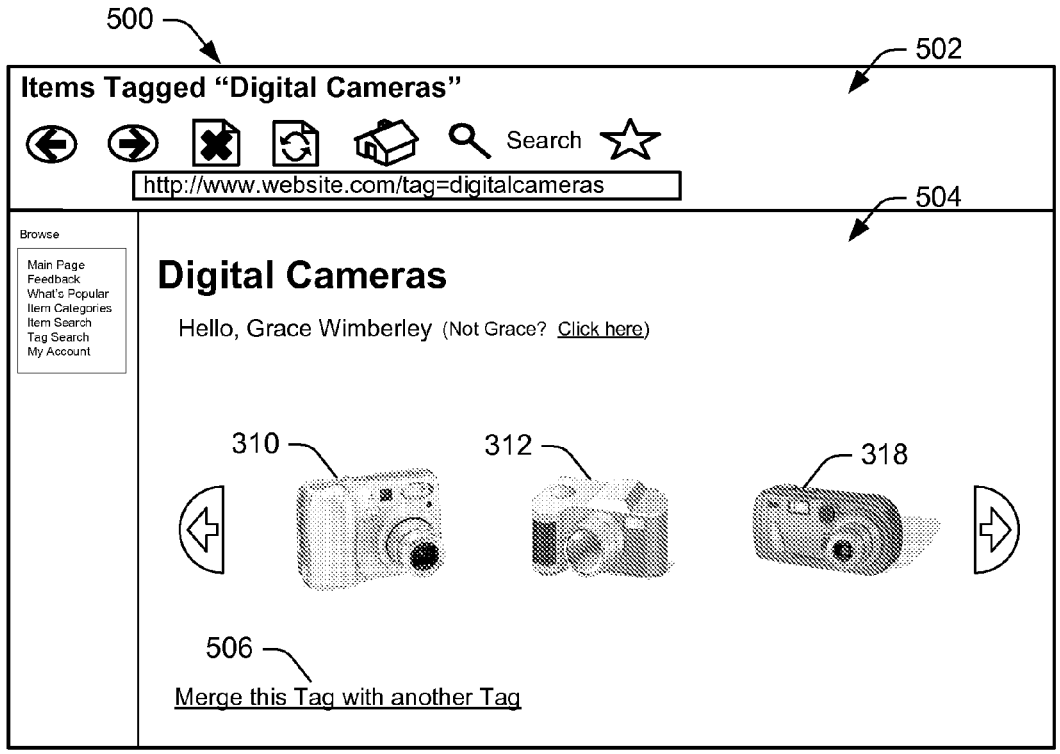
FIG. 5 is a screen rendering of another illustrative page for implementing tag merging. Here, the illustrative page includes a link entitled "Merge this Tag with another Tag".

FIG. 5, for instances, illustrates a screen rendering of another page 500 that depicts items within item catalog 112 that have been associated with the tag "Digital Cameras". Similar to page 400, page 500 includes a browser toolbar 502 and a content area 504. Here, however, content area 504 includes a hyperlink 506 that, when actuated, enables the user to vote to "Merge this Tag with another Tag".

Figure 6:
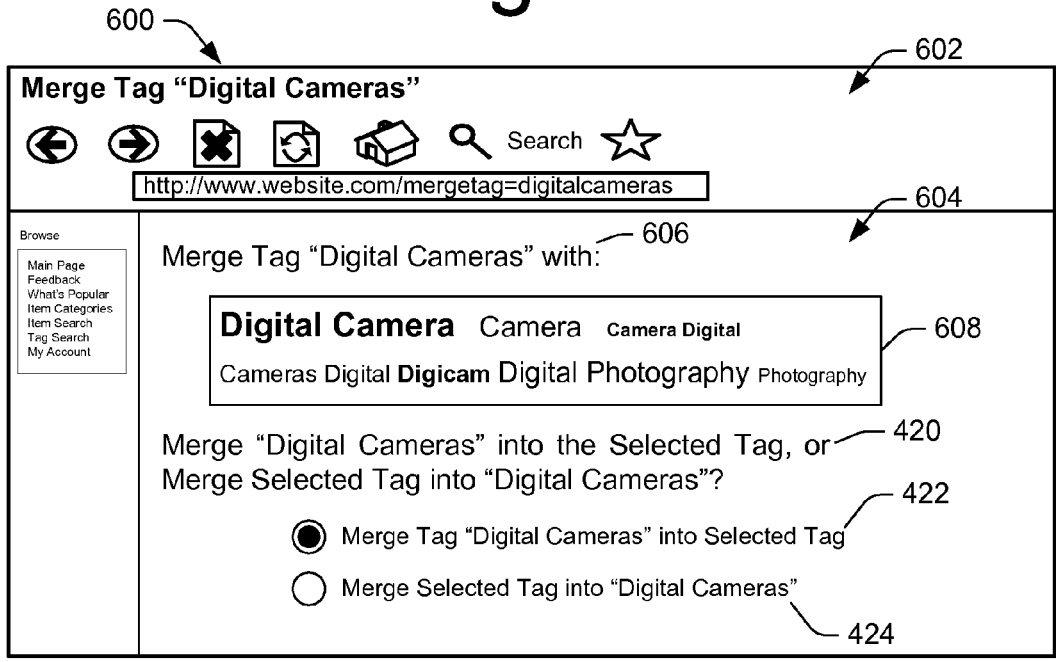
FIG. 6 is a screen rendering of another illustrative page that may be served after selection of the link from FIG. 5 or otherwise.

FIG. 6, meanwhile, illustrates a screen rendering of a page 600 that website 106 may serve in response to the user actuating hyperlink 506. Elements of page 600, however, may also be included within other pages, such as page 400. Similar to pages 400 and 500, page 600 includes a browser toolbar 602 and a content area 604. Content area 604 includes a title 606 introducing a tag cloud 608. Tag cloud 608 includes the same logically-related tags included within list 418. Here, ranks given by ranking tool 212 may be emphasized via an ordering within the tag cloud, varying fonts, colors, bold, italics, and the like. These varying fonts and the like may alternatively indicate a relative size of each tag's collection of items and/or a relative time since the tag was last used by one of customers 102. Once a users selects a tag (or multiple tags) from tag cloud 608, meanwhile, the user may select one of areas 422 and 424 to vote to merge the particular tag "Digital Cameras" into the selected logically-related tag, or vice versa.

Figure 7:
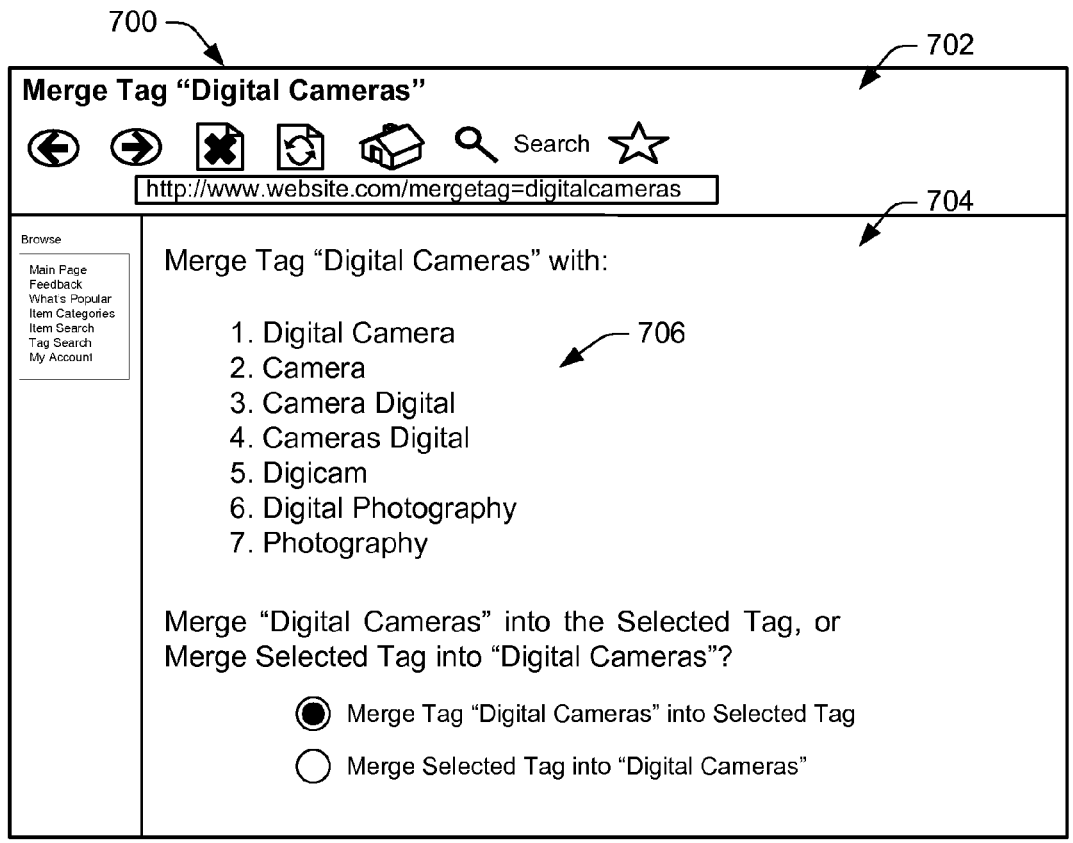
FIG. 7 is a screen rendering of another illustrative page that may be served after selection of the link from FIG. 5 or otherwise.

In addition to illustrating logically-related tags within drop-down menu 416 and tag cloud 608, presentation tool 128 may depict the related tags within an ordered list. FIG. 7, for instance, illustrates a screen rendering of a page 700 that, similar to page 600, may be served in response to the user actuating hyperlink 506. Again, however, elements of page 700 may also be illustrated in other pages, such as pages 400 and 500. Here, page 700 includes a browser toolbar 702 and a content area 704. Content area 704 here depicts the logically-related tags within an ordered list 706. This ordering may be arbitrary, alphabetically, or may reflect rankings determined by ranking tool 212.

Figure 8:
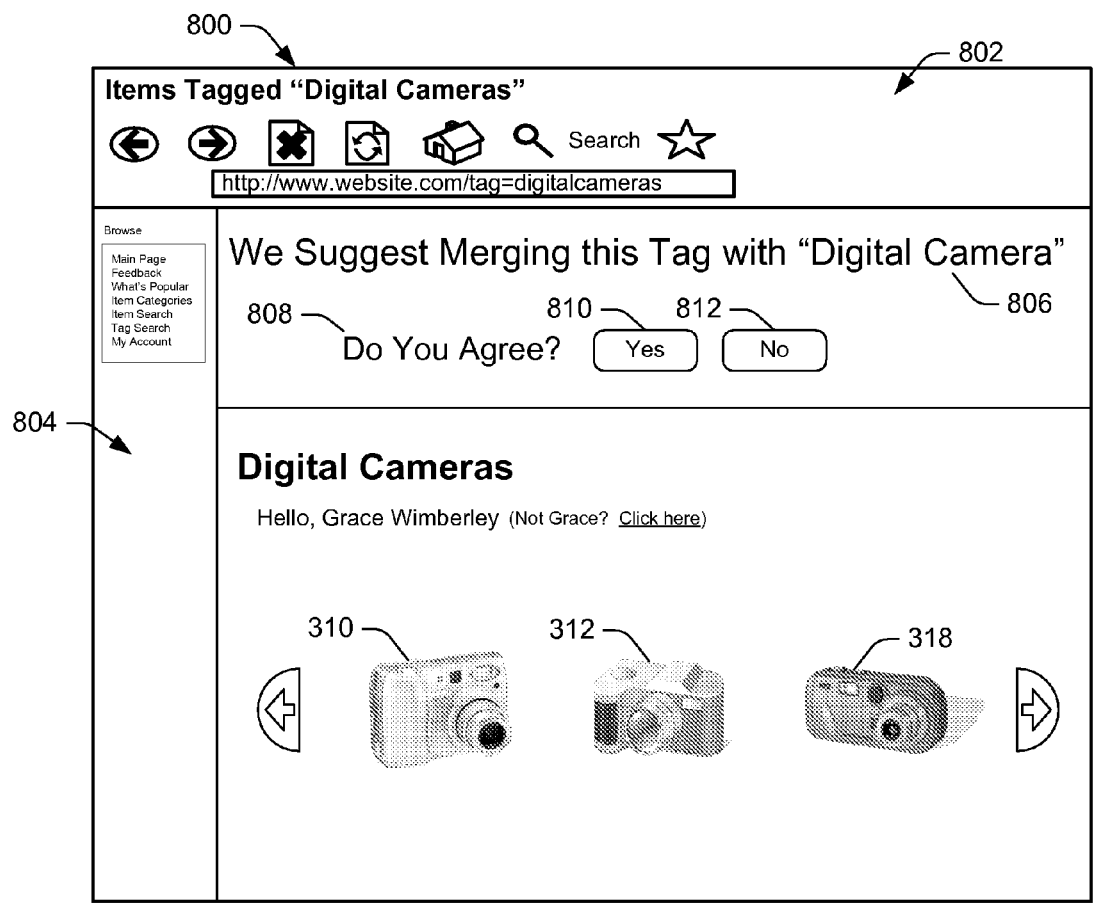
FIG. 8 is a screen rendering of another illustrative page for implementing tag merging. Here, a hosting entity suggests that the illustrated tag "Digital Cameras" be merged with a tag entitled "Digital Camera"

Finally, FIG. 8 illustrates a screen rendering of another page 800 that depicts collection of items 324 associated with "Digital Cameras" tag 322. Again, page 800 includes a browser toolbar 802 and a content area 804. Here, however, page 800 suggests to the user, via a suggestion 806, that the user vote to merge tag 322. In fact, suggestion 806 here actually suggests a particular logically-related tag (tag 302 entitled "Digital Camera") in which to merge with tag 322. Additionally, page 800 includes an area 808 in which the page solicits the user's vote. Here, the user may actuate a "Yes" icon 810 to vote to merge "Digital Cameras" with "Digital Camera" or may actuate a "No" icon 812 to vote against merging these tags. In some instances, page 800 may suggest a direction in which to merge these tags, while page 800 may not in other instances.

Operation

FIGS. 9-11 depict illustrative processes 900-1100 for implementing the tag-merging techniques discussed above. These processes are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Process 900 includes operation 902, which represents determining a set of tags that are logically related to a particular tag. Operation 904 then serves a page that contains items in an electronic catalog that are associated with the particular tag. Operation 906, meanwhile, displays, on the page, the set of logically-related tags to enable a user to vote to merge the particular tag with one or more of the logically-related tags. Next, operation 908 receives a vote to merge. Operation 910 then merges the logically-related tag with the particular tag, possibly in response to user selection. At operation 912, a selection of the logically-related tag is received by, for instance, a user conducting a tag search for the logically-related tag. Finally, operation 914 serves a page that contains items in the electronic catalog that have been associated with the particular tag, as well as items that have been associated with the logically-related tag.

FIG. 10 illustrates process 1000, which includes operation 1002. Here, a tag that is logically-related to a particular tag is determined. Operation 1004, meanwhile, presents the logically-related tag to a user to enable the user to vote to merge the particular tag and the logically-related tag. Operation 1006 then determines additional tags that are logically-related to the particular tag. Operation 1008, then, ranks the logically-related tags.

Operation 1010, meanwhile, represents receiving a vote from a user to merge a logically-related tag with the particular tag. At operation 1012, this vote is weighted based at least in part on a reputation of the voting user. Next, operation 1014 merges the logically-related tag with the particular tag. Finally, operation 1016 serves a page that contains items associated with the particular tag in response to receiving a user selection of the logically-related tag.

Next, FIG. 11 depicts illustrative process 1100 includes, which includes operation 1102. This operation again determines a tag that is logically-related to a particular tag. Next, operation 1104 determines additional logically-related tags. Operation 1106 then presents the logically-related tags to a user to enable the user to vote to merge one or more of the tags. Next, operation 1108 determines an overlap between items associated with the particular tag and items associated with a logically-related tag. Operation 1114, then, enables one or more users to merge the tags if the determined overlap is greater than a first value, but less than a second value. If the determined overlap is greater than both values, however, then operation 1112 suggests merging these tags.

Operation 1114, meanwhile, merges the logically-related tag with the particular tag based at least in part on user-selection. At operation 1116, a request is received from a particular user for items associated with the logically-related tag or the particular tag. Operation 1118, finally, serves a page with associated with the logically-related tag if the particular has used (e.g., tagged items with) the logically-related tag. Otherwise, operation 1120 serves a page with items associated with the particular tag.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method of implementing an electronic catalog, comprising:
   determining, via one or more computing devices, a set of tags that are logically-related to a particular tag;
   determining an overlap between items associated with the particular tag and items associated with a logically-related tag of the determined set of logically-related tags;
   serving a page that contains items in the electronic catalog that are associated with the particular tag;
   displaying, on the served page, at least partly in response to the determined overlap being greater than a first value but less than a second value, the set of logically-related tags to enable a user to vote to merge the logically-related tag with the particular tag;
   providing a message to the user that includes a suggestion to vote to merge the logically-related tag with the particular tag at least partly in response to the determined overlap being greater than both the first value and the second value;
   receiving, from the user, a vote to merge the logically-related tag with the particular tag;
   at least in part in response to receiving the vote, merging the logically-related tag with the particular tag;
   receiving a selection of the logically-related tag; and
   serving a page that contains the items in the electronic catalog that have been associated with the particular tag and items in the electronic catalog that have been associated with the logically-related tag in response to the receiving of the selection of the logically-related tag.

2. The method as recited in claim 1, wherein the overlap indicates a relationship strength between items based at least in part on a co-presence of the particular tag and the logically-related tag associated with each of the one or more items.

3. A method comprising:
   determining, via one or more computing devices, that a tag is logically related to a particular tag, the logically-related tag being associated with one or more first items in an electronic catalog and the particular tag being associated with one or more second items in the electronic catalog, wherein the determining comprises (1) analyzing the particular tag and the logically-related tag to determine one or more common root words, or (2) analyzing grammatical variations of the particular tag or the logically-related tag;
   determining an overlap between the one or more first items associated with the logically-related tag and the one or more second items associated with the particular tag;
   presenting the logically-related tag to a user to enable the user to vote to merge the logically-related tag with the particular tag at least partly in response to the overlap being greater than a first value but less than a second value; and
   providing a suggestion to the user to provide input to merge the logically-related tag with the particular tag at least partly in response to the overlap being greater than both the first value and the second value.

4. A method as recited in claim 3, wherein the determining of the logically-related tag further comprises determining that users who searched for the particular tag during a particular session also searched for the logically-related tag during the particular session.

5. A method as recited in claim 3, wherein the determining of the logically-related tag further comprises determining: (1) that a number of items associated with the particular tag are also associated with the logically-related tag, or (2) that a number of items associated with the logically-related tag are also associated with the particular tag.

6. A method as recited in claim 3, wherein the presenting of the logically-related tag comprises populating a drop-down menu with the logically-related tag and one or more other tags that are logically related to the particular tag.

7. A method as recited in claim 3, further comprising:
   merging the logically-related tag with the particular tag; and
   serving a page containing items in the electronic catalog and associated with the particular tag in response to receiving a user selection of the logically-related tag.

8. A method as recited in claim 3, further comprising merging the logically-related tag with the particular tag at least in part in response to receiving a threshold number of votes to merge the logically-related tag with the particular tag, wherein the merging comprises associating the particular tag with an item in the electronic catalog that has previously been associated with the logically-related tag.

9. A method as recited in claim 3, wherein the providing includes enabling the user to vote against merging the logically-related tag with the particular tag, and further comprising merging the logically-related tag with the particular tag at least in part in response to a threshold ratio of received votes to merge versus received votes against merging.

10. A method as recited in claim 3, further comprising:
determining that additional tags are logically-related to the particular tag; and
ranking the logically-related tags.

11. A method comprising:
determining, via one or more computing devices, a tag that is logically related to a particular tag;
determining an overlap between items associated with the particular tag and items associated with the logically-related tag;
providing an option to enable one or more users to merge the logically-related tag with the particular tag at least partly in response to the determined overlap being greater than a first value but less than a second value;
suggesting to the one or more users to merge the logically-related tag with the particular tag at least partly in response to the determined overlap being greater than both the first value and the second value; and
merging the logically-related tag with the particular tag at least in part based on user selection of the logically-related tag.

12. A method as recited in claim 11, wherein the determining of the logically-related tag comprises: (1) analyzing keyword-to-keyword similarity data, or (2) determining a number of items in an electronic catalog that have been associated with both the logically-related tag and the particular tag.

13. A method as recited in claim 11, wherein the merging comprises: (1) associating each item that is in an electronic catalog and associated with the particular tag with the logically-related tag, or (2) associating each item that is in the electronic catalog and associated with the logically-related tag with the particular tag.

14. A method as recited in claim 11, wherein the logically-related tag and the particular tag are each associated with one or more items in an electronic catalog, and wherein the merging comprises:
merging the logically-related tag into the particular tag if the particular tag is associated with more items in the electronic catalog than is the logically-related tag; and
merging the particular tag into the logically-related tag if the logically-related tag is associated with more items in the electronic catalog than is the particular tag.

15. A method as recited in claim 11, wherein the logically-related tag and the particular tag are each associated with one or more items in an electronic catalog, and wherein the merging comprises:
merging the logically-related tag into the particular tag if more users have associated the particular tag with items in the electronic catalog than have associated the logically-related tag with items in the catalog; and
merging the particular tag into the logically-related tag if more users have associated the logically-related tag with items in the electronic catalog than have associated the particular tag with items in the catalog.

16. A method as recited in claim 11, wherein the merging comprises:
enabling a user to vote to merge the logically-related tag into the particular tag; and
enabling the user to vote to merge the particular tag into the logically-related tag.

17. A method as recited in claim 11, further comprising determining whether to merge the logically-related tag into the particular tag or whether to merge the particular tag into the logically-related tag, and wherein the determining is based, at least in part, on which tag has received more user selections or which tag, when selected, has resulted in more user purchases.

18. A method as recited in claim 11, further comprising:
determining a set of tags that are logically related to the particular tag; and
presenting the set of tags to a user to enable the user to vote to merge the particular tag with a tag of the set of logically-related tags.

19. A method as recited in claim 11, further comprising suggesting to the user that the logically-related tag be merged with the particular tag.

20. A method as recited in claim 11, further comprising:
after the merging, receiving a request from a particular user for items associated with the logically-related tag and the particular tag;
if the particular user has previously associated items with the logically-related tag, then serving a page that includes the items as being associated with the logically-related tag; and
otherwise, serving a page that includes the items as being associated with the particular tag.

21. A method as recited in claim 11, wherein determining an overlap comprises:
determining a relationship strength value of the logically-related tag to the particular tag; and
classifying the logically-related tag based at least in part on the relationship strength value to the particular tag.

22. A server system comprising:
one or more processors;
memory, accessible by the one or more processors;
a related tag engine executed by the one or more processors and configured to determine a tag that is logically-related to a particular tag, and wherein the related tag engine comprises:
an item overlap tool configured to determine an overlap between items associated with the particular tag and items associated with the logically-related tag; and
a tag-merging engine executed by the one or more processors and configured to merge the logically-related tag with the particular tag based, at least in part, on user selection of the logically-related tag, and wherein the tag-merging engine comprises:
a ranking tool configured to rank the logically-related tag amongst additional tags that are logically related to the particular tag;
a presentation tool configured to
receive the logically-related tags;
present the logically-related tags to a user to enable the user to vote to merge one of the logically-related tags with the particular tag based at least in part on the overlap being greater than a first value but less than a second value; and
present a suggestion to merge one of the logically-related tags with the particular tag based at least in part on the overlap being greater than both the first value and the second value; and
a merge-direction tool configured to determine whether to merge the logically-related tag into the particular tag or whether to merge the particular tag into the logically-related tag based, at least in part, on user selection.

23. A server system as recited in claim 22, further comprising an item catalog that includes multiple items, and wherein the related tag engine comprises:
- a keyword-to-keyword tool configured to determine the logically-related tag by determining that users who employed the particular tag to search the items in the item catalog also employed the logically-related tag to search the items;
- wherein the item overlap tool is further configured to determine the overlap between items associated with the particular tag and items associated with the logically-related tag by determining that: (i) a certain percentage of items associated with the logically-related tag are also associated with the particular tag, or (ii) a certain percentage of items associated with the particular tag are also associated with the logically-related tag; and
- a stemming logic tool configured to determine the logically-related tag by determining a common root of the logically-related tag and the particular tag or by analyzing grammatical variations of the logically-related tag or the particular tag.

24. A server system as recited in claim 22, wherein the related tag engine is further configured to:
- determine a relationship strength value of the logically-related tag to the particular tag; and
- classify the logically-related tag based at least in part on the relationship strength value to the particular tag.

* * * * *